(No Model.)
W. I. BUNKER.
WHEEL GUARD.
No. 477,504. Patented June 21, 1892.
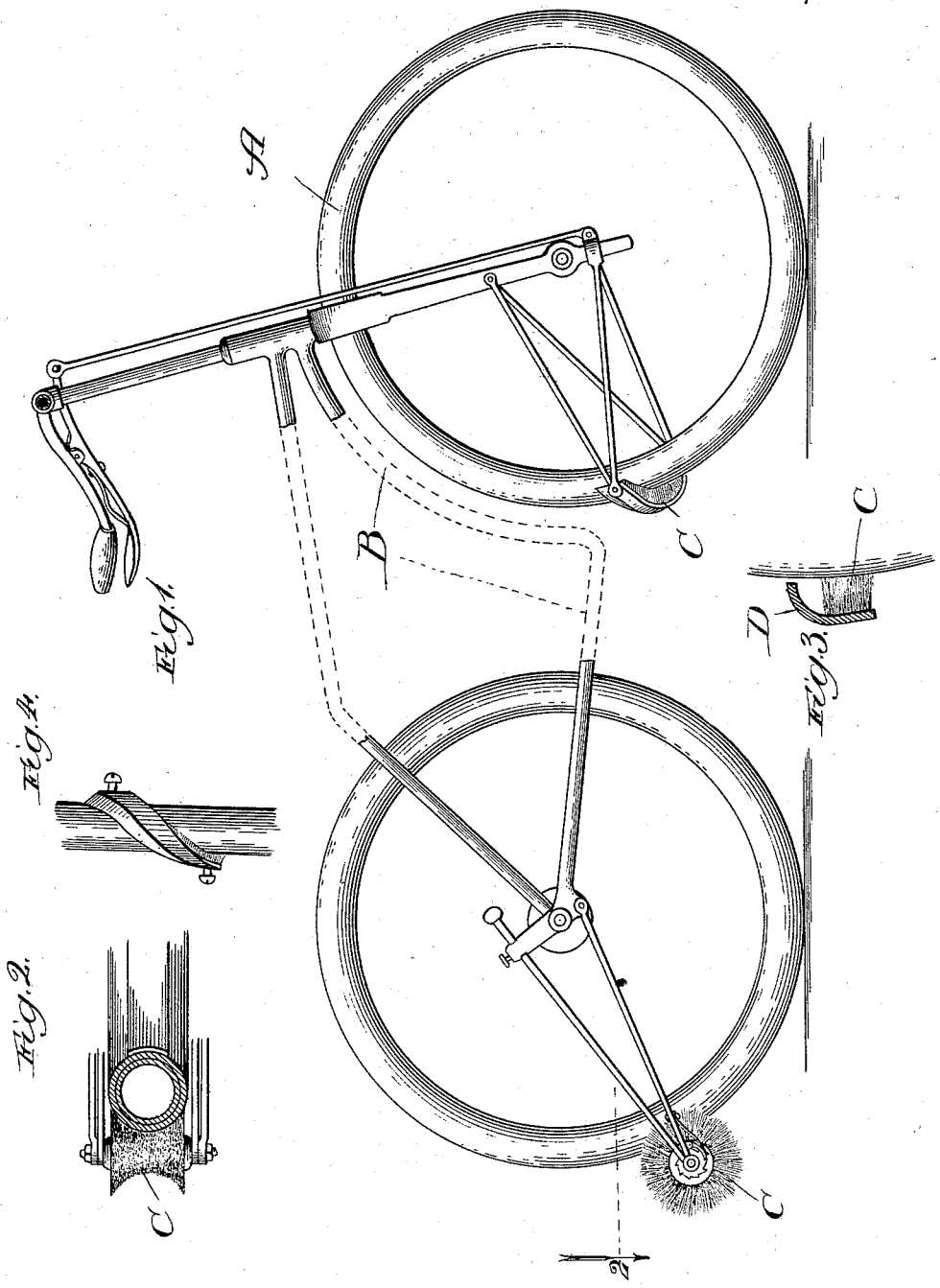
Witnesses:
Inventor
William I. Bunker,
By Banning & Banning & Payson,
Att'ys

UNITED STATES PATENT OFFICE.

WILLIAM I. BUNKER, OF LA GRANGE, ILLINOIS.

WHEEL-GUARD.

SPECIFICATION forming part of Letters Patent No. 477,504, dated June 21, 1892.

Application filed February 27, 1892. Serial No. 422,996. (No model.)

*To all whom it may concern:*

Be it known that I, WILLIAM I. BUNKER, of La Grange, Cook county, Illinois, have invented a new and useful Improvement in Wheel-Guards, of which the following is a specification.

The object of my invention is to provide a brush or cleaner for wheels, particularly bicycle-wheels, which in some cases may also operate as a brake; and the invention consists in the combinations hereinafter described and claimed.

In the accompanying drawings, Figure 1 is a side elevation of a bicycle provided with my improved brush, the brush being shown in different forms on the respective wheels; Fig. 2, a broken plan view taken in line 2 of Fig. 1, and Figs. 3 and 4 detail views of the guard and brush shown on the front wheel of Fig. 1.

A is the wheel; B, the frame; C, the brush, and D the frame supporting the brush.

The continuous mud-guards heretofore used on bicycle-wheels have been found objectionable in that they were heavy, unsightly, and had a constant tendency to collect or accumulate mud adhering to the tire of the wheel, and these objections have proved so serious that their use is now being discontinued. If entirely discontinued, however, and nothing used in their place, the rapid revolution of the wheel causes the mud to be thrown upward onto the rider, which is of course very objectionable.

The object of my invention is to provide a simple brush or cleaning device which, preferably coming in contact with the wheel at the point where centrifugal action causes adhering particles to separate therefrom, shall be free from the objections found to exist in the old continuous mud-guards above referred to and which in other respects shall be simple in construction and efficient in operation.

My improved brush or wheel-guard may be constructed in any convenient form and secured in any convenient way; but I prefer to construct it as shown in Fig. 1, front wheel, and illustrated in detail in Figs. 3 and 4. When constructed in this way, it consists, essentially, of a guard secured to the frame and a brush secured to the lower end of the guard and adapted to be brought in contact with the tread or periphery of the wheel at about the point where centrifugal action causes mud or adhering particles to separate therefrom. The guard constructed in this form extends downwardly, so as to allow the accumulation of mud or material to readily drop out without clogging the brush or interfering with the action of the brake. It is preferably so constructed that it will not touch the periphery of the wheel until brought in contact therewith by the action of the brake-lever, but still arranged sufficiently near to practically intercept all mud or dirt adhering thereto and which would otherwise be thrown upward by the centrifugal action of the wheel.

In some cases it may be found desirable to omit the brush and use the guard portion alone, the guard in this case serving to protect the occupant from mud thrown up by the action of the wheel, and in some cases, where both the brush and guard are used, the brush, in addition to cleaning the wheel, may be made to operate as a brake-shoe.

As shown in Fig. 1, rear wheel, and illustrated in detail in Fig. 2, the brush-frame is so constructed that it may be set and held in any fixed position by a set-screw, and the brush itself is constructed in such form as to be capable of revolving only in one direction, ratchet mechanism preventing opposite revolutions or action. The brush constructed in this form may be used alone or inclosed by suitable guard mechanism.

As already stated, the advantages of my invention are that it provides a simple efficient brush or cleaning device, readily adjustable, light in construction, and especially adapted to prevent clogging of the wheel.

Although I have described my invention as applied to a bicycle-wheel, it will of course be understood that I contemplate using it in connection with any and all wheels to which it may be found applicable. It will also be understood that I do not intend to limit myself to special forms or details of construction, but intend to change form of construction or to use equivalent parts as may be found expedient.

I claim—

1. In combination with a wheel, a guard and brush adjacent to the periphery of the wheel, the guard serving to arrest upwardly-flying particles and the brush to clean the periphery, substantially as described.

2. In combination with a wheel, a guard and brush adjacent to the periphery of the wheel, at least one of them being set at an angle to arrest upwardly-flying particles, substantially as described.

3. In combination with a wheel, a guard and brush adjacent to the periphery of the wheel and mechanism for bringing the guard and brush into contact with the periphery for braking purposes, substantially as described.

4. In combination with a wheel, a brush adjacent to the periphery of the wheel and set at an angle to arrest upwardly-flying particles and throw the same sidewise, substantially as described.

5. In combination with a wheel, a guard provided with a revoluble brush, substantially as described.

6. In combination with a wheel, a revoluble brush and mechanism to hold the brush in position, whereby it is caused to revolve by the revolution of the wheel, substantially as described.

7. In combination with a wheel, a brush adjacent to the periphery of the wheel and mechanism for bringing the brush into contact with the periphery for braking purposes, substantially as described.

8. In combination with a wheel, a guard provided with a brush adjacent to the periphery of the wheel, substantially at the point where centrifugal action causes adhering particles to separate from the wheel, and mechanism for bringing the brush into contact with the periphery for braking purposes, substantially as described.

WILLIAM I. BUNKER.

Witnesses:
EPHRAIM BANNING,
SAMUEL E. HIBBEN.